(12) United States Patent
Chan

(10) Patent No.: US 9,134,780 B2
(45) Date of Patent: Sep. 15, 2015

(54) APPARATUS AND METHOD FOR PROVIDING ADAPTIVE POWER STATE CONTROL BASED ON IGNITION INPUT

(71) Applicant: SYMBOL TECHNOLOGIES, INC., Schaumburg, IL (US)

(72) Inventor: Kevin Kar Yin Chan, Woodbridge, CA (US)

(73) Assignee: Symbol Technologies, LLC, Holtsville, NY (US)

( * ) Notice: Subject to any disclaimer, the term of this patent is extended or adjusted under 35 U.S.C. 154(b) by 87 days.

(21) Appl. No.: 14/076,779

(22) Filed: Nov. 11, 2013

(65) Prior Publication Data

US 2015/0134979 A1 May 14, 2015

(51) Int. Cl.
*G01M 17/00* (2006.01)
*G06F 1/26* (2006.01)
*G07C 5/00* (2006.01)

(52) U.S. Cl.
CPC *G06F 1/26* (2013.01); *G06F 1/266* (2013.01); *G07C 5/00* (2013.01)

(58) Field of Classification Search
CPC .............. G06F 1/00; G06F 1/266; G07C 5/00
USPC .................... 701/24, 29.1–29.9; 455/557, 574
See application file for complete search history.

(56) References Cited

U.S. PATENT DOCUMENTS

| 5,954,820 | A | 9/1999 | Hetzler | |
|---|---|---|---|---|
| 6,163,690 | A * | 12/2000 | Lilja | 455/574 |
| 7,117,075 | B1 | 10/2006 | Larschan et al. | |
| 8,468,377 | B2 * | 6/2013 | Scott et al. | 713/323 |
| 2005/0137757 | A1 | 6/2005 | Phelan et al. | |
| 2012/0173038 | A1 * | 7/2012 | Davis et al. | 701/1 |
| 2012/0191995 | A1 | 7/2012 | Naveh et al. | |

FOREIGN PATENT DOCUMENTS

| EP | 1950642 A1 | 7/2008 |
|---|---|---|
| WO | 2000046930 A1 | 8/2000 |

* cited by examiner

*Primary Examiner* — Thomas G Black
*Assistant Examiner* — Luke Huynh

(57) ABSTRACT

A computer includes a communication unit for obtaining usage data and/or run-time data associated with the computer, at least one component communicatively coupled to the computer, and/or a vehicle on which the computer is mounted and from which the computer is configured to receive power. The computer further includes a processor configured to: extrapolate out of the usage data and run-time data patterns associated with activities implemented by the computer and/or the at least one component and power states of the vehicle and create and store a profile of patterns; receive an indication that the vehicle has been toggled to one of an ON power state and an OFF power state; identify a pattern associated with the power state of the vehicle; and adapt a power state of the computer and/or the at least one component responsive to the indication and the pattern.

18 Claims, 4 Drawing Sheets

APPARATUS AND METHOD FOR PROVIDING ADAPTIVE POWER STATE CONTROL BASED ON IGNITION INPUT

BACKGROUND OF THE INVENTION

In certain supply chain and logistic environments, for example, warehouses, factories, and/or ports, industrial vehicles such as forklifts may include minimal computing electronics. To improve operator usability and/or to perform a variety of essential tasks that allows the vehicle to function properly, a computer communicatively coupled to one or more peripherals (for example, scanners, radios and other components) may be mounted on or embedded in the vehicle. The vehicle-mounted computer may control operations of one or more of the peripherals to which it is communicatively coupled. For example, the vehicle-mounted computer may be configured to turn on and off one or more peripherals to which it is communicatively coupled.

The vehicle-mounted computer and the communicatively coupled peripherals may receive power from the vehicle such that when the vehicle is switched on or off, an ignition signal is sent from the vehicle to the vehicle-mounted computer. However, it is important that the vehicle-mounted computer and/or the peripherals not drain the vehicle battery when the vehicle ignition is switched off. Therefore, the ignition signal indicating that the vehicle is switched off is used to alert the vehicle-mounted computer that the vehicle-mounted computer and/or the peripherals need to either be powered off or put in a low power state in order not to drain the vehicle battery before the vehicle can be restarted. Similarly, when the vehicle is switched on, the ignition signal may be used to alert the vehicle-mounted computer so that the vehicle-mounted computer and/or the peripherals can be switched on to a full power state. However, the vehicle-mounted computer and/or the peripherals put in a low power state when the vehicle is switched off may require time to resume when the vehicle is switched on. For some peripherals, the startup process may include a system registration with the system on which the peripheral operates. For example, a radio being turned on may have to log in with the cellular and/or wireless network on which the radio operates. Processors being executed on the vehicle-mounted computer and/or the peripherals may therefore require time to reawaken, turn on displays, reload drivers and/or restart any programs and sessions that were running before the vehicle-mounted computer and/or the peripherals were put in the low power state or powered off. Therefore, there is a tradeoff between power savings and the time required to return the vehicle-mounted computer and/or the peripherals to a full power state.

Accordingly, there is a need for an apparatus and method for providing adaptive power state control based on ignition input.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
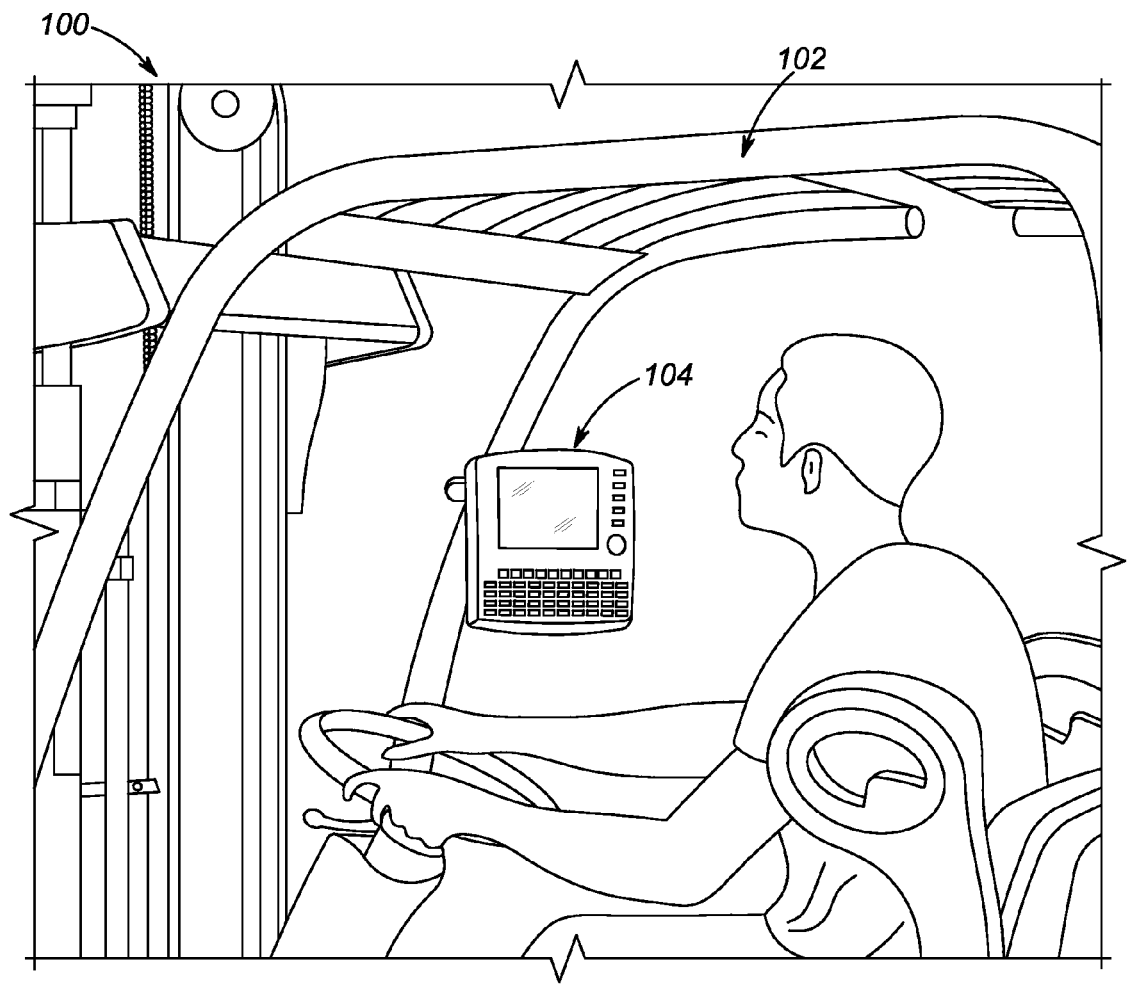
FIG. 1 is a diagram of a system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and apparatuses for dynamically adapting the power states of a vehicle-mounted computer and/or at least one component communicatively coupled to the computer. The computer includes a communication unit configured to obtain at least one of usage data and run-time data associated with the computer, at least one component communicatively coupled to the computer, and/or a vehicle on which the computer is mounted and from which the computer is configured to receive power. The computer also includes a memory configured to store the usage data and run-time data. The computer further includes a processor configured to: extrapolate, out of the usage data and run-time data, patterns associated with activities implemented by the computer and/or the at least one component and power states of the vehicle; create and store a profile of patterns; receive an indication that the vehicle has been toggled to one of an ON power state and an OFF power state; identify a pattern associated with the power state of the vehicle; and adapt a power state of the computer and/or the at least one component responsive to the indication and the pattern.

FIG. 1 is a diagram of a system used in accordance with some embodiments. System 100 includes a vehicle 102 on which is mounted a computer 104 (referred to as vehicle-mounted computer). Vehicle 102 may be, for example, a forklift, a truck or any other vehicle that includes an ignition switch. Vehicle 102 may be used in a facility such as a warehouse, port, or factory where work may be synchronized with time. Vehicle-mounted computer 104 is configured to operate by drawing power from a power system on vehicle 102. When vehicle 102 is powered to an ON or OFF state, vehicle 102 sends a status signal (also referred to as the ignition detect signal) to vehicle-mounted computer 104 to alert vehicle-mounted computer 104 about the power status of vehicle 102. It should be noted that even when vehicle 102 is switched to an OFF power state, vehicle 102 may continue to provide power to vehicle-mounted computer 104. This enables vehicle-mounted computer 104 to detect the states and transitions of the ignition detect signal at any time.

Vehicle-mounted computer 104 is configured to adapt its power state and the power state of one or more internal and/or external components (not shown) based on patterns relating to activities performed before, during, and after receiving the ignition detect signal, thereby preserving the power provided by vehicle 102 when it is in an OFF state. Vehicle-mounted computer 104 may also adapt its power state and the power state of one or more internal and/or external components prior to receiving the ignition detect signal. For example, vehicle-mounted computer 104 may turn on one or more peripherals before it receives the ignition detect signal in order to ready those peripherals for use when the vehicle is switched on. Subsequent to receiving an ignition detect signal indicating that vehicle is in the OFF state, vehicle-mounted computer 104 may shut down or put one or more communicatively coupled internal and/or external components in a low power mode, depending on collected usage data and/or operating conditions on vehicle-mounted computer 104. In some embodiments, vehicle-mounted computer 104 may include an adaptive power configuration component (described below and shown in FIG. 3) configured to collect usage and run-time data and to adapt power configuration of vehicle-mounted computer 104 and/or one or more communicatively coupled internal and/or external components based the collected usage and run-time data.

Figure 2:
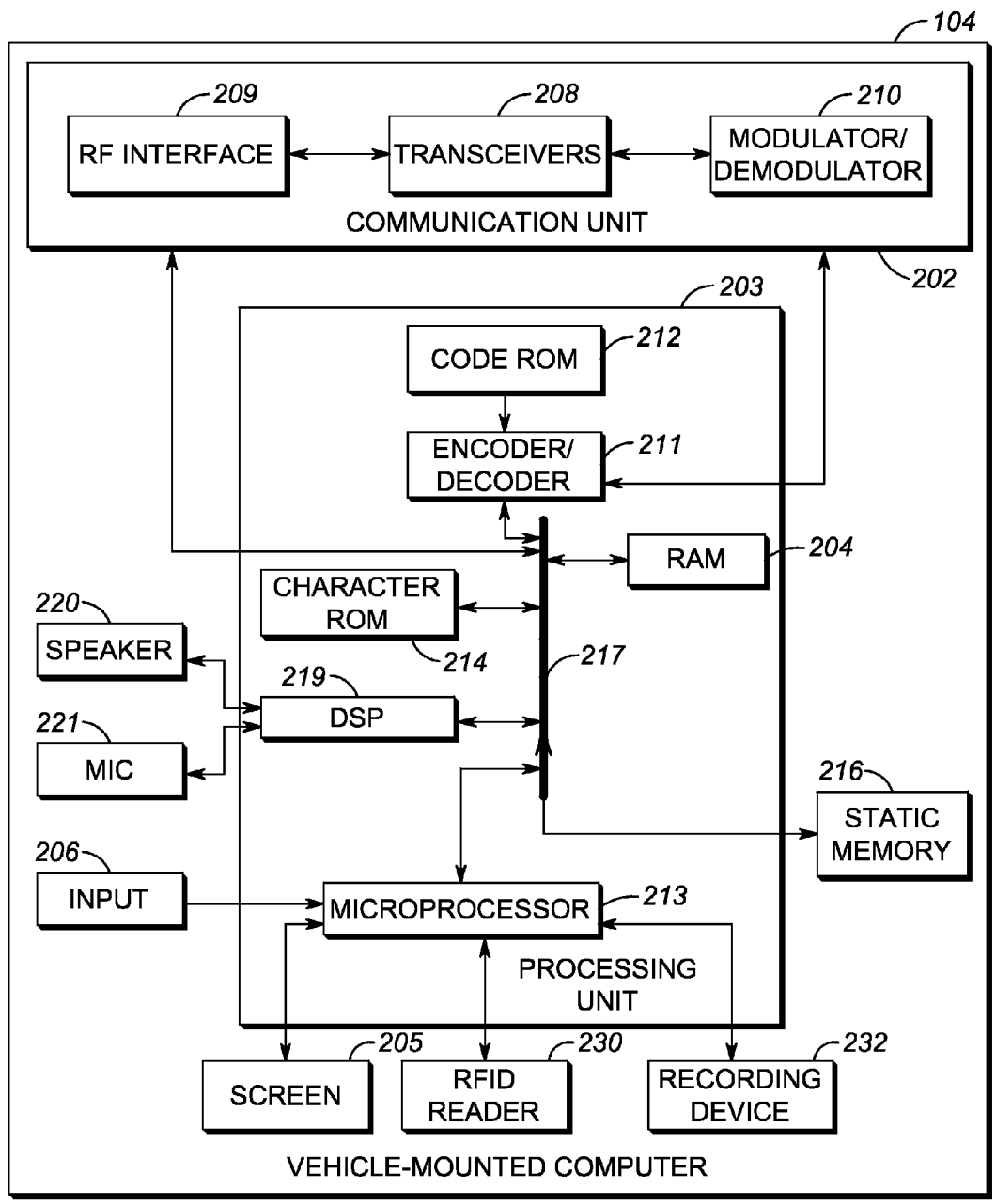
FIG. 2 is a block diagram of the vehicle-mounted computer used in accordance with some embodiments.

FIG. 2 is a block diagram of the vehicle-mounted computer in accordance with some embodiments. Vehicle-mounted computer 104 includes a communications unit 202 coupled to a common data and address bus 217 of a processing unit 203. Vehicle-mounted computer 104 may also include one or more peripherals, for example, a radio frequency identifier (RFID) reader 230 configured to scan RFID tags or a recording device 232 such as a camera. Vehicle-mounted computer 104 may also include an input unit (e.g., keypad, pointing device, etc.) 206, an output transducer unit (e.g., speaker) 220, an input transducer unit (e.g., a microphone) (MIC) 221, and a display screen 205, each coupled to be in communication with the processing unit 203. The speaker/microphone configuration may be configured with Push-To-Talk capability and Voice over IP (VoIP) capability. Vehicle-mounted computer 104 may also be communicatively coupled to one or more external peripherals/components (not shown) including, for example, communication devices such as mobile or portable radios. In some embodiments, vehicle-mounted computer 104 may be configured to control its power configurations and/or operations of the external peripherals based on a power indication received from vehicle 102.

Processing unit 203 may include an encoder/decoder 211 with an associated code read only memory (ROM) 212 for storing data for encoding and decoding voice, data, control, or other signals that may be transmitted or received by vehicle-mounted computer 104. Processing unit 203 may further include a microprocessor 213 coupled, by the common data and address bus 217, to the encoder/decoder 211, a character ROM 214, a random-access memory (RAM) 204, and a static memory 216. The processing unit 203 may also include a digital signal processor (DSP) 219, coupled to the speaker 220, the microphone 221, and the common data and address bus 217, for operating on audio signals received from one or more of the recording device 232, the communications unit 202, the static memory 216, and the microphone 221.

Communications unit 202 may include an (radio frequency) RF interface 209 configurable to communicate with network components, and other user equipment within its communication range. Communications unit 202 may include one or more broadband and/or narrowband transceivers 208, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 202 may also include one or more local area network or personal area network transceivers such as wireless local area network transceiver perhaps operating in accordance with an IEEE 802.11 standard (e.g., 802.11a, 802.11b, 802.11g), or a Bluetooth transceiver. For any IEEE standards recited herein, contact the IEEE at IEEE, 445 Hoes Lane, PO Box 1331, Piscataway, N.J. 08855-1331, USA.

The transceivers may be coupled to a combined modulator/demodulator 210 that is coupled to the encoder/decoder 211.

The character ROM 214 stores code for decoding or encoding data such as control, request, or instruction messages, channel change messages, and/or data or voice messages that may be transmitted or received by vehicle-mounted computer 104. Static memory 216 may store operating code associated with an adaptive power configuration component (described further in FIG. 3) and for performing one or more of the steps set forth in FIG. 4.

Figure 3:
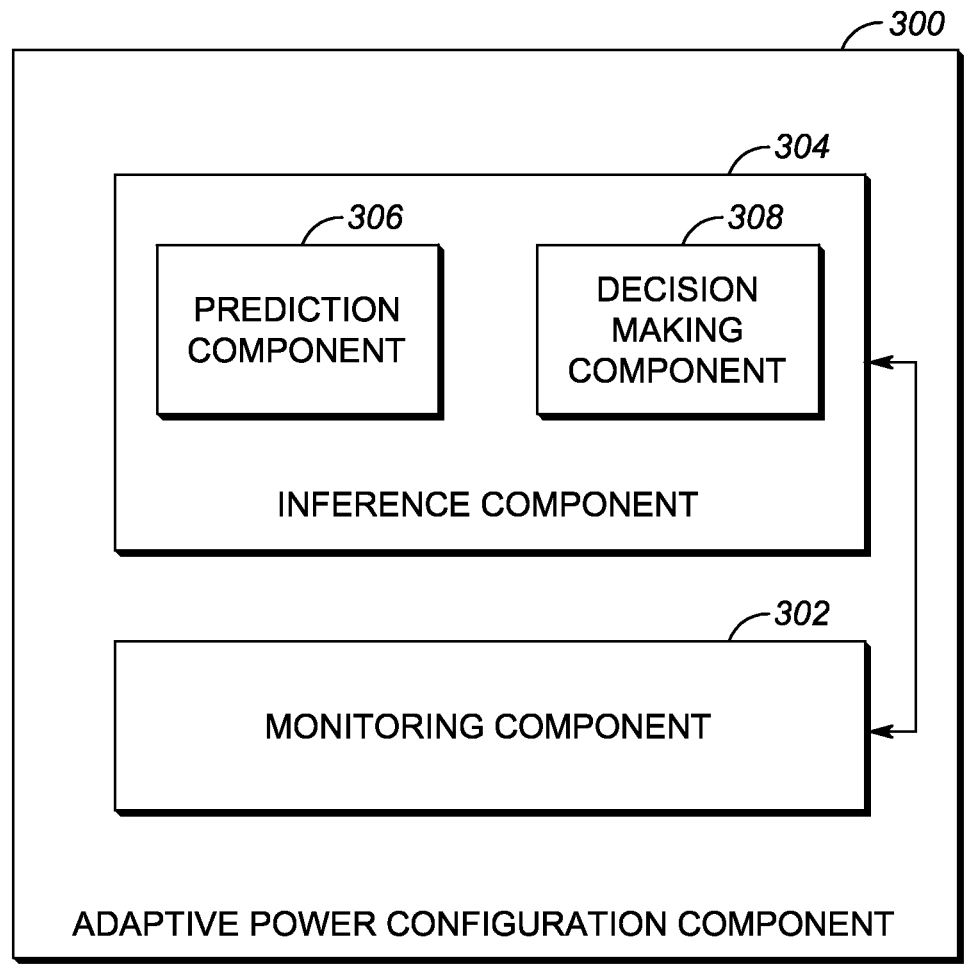
FIG. 3 is a block diagram of the adaptive power configuration component used in accordance with some embodiments.

FIG. 3 is a block diagram of the adaptive power configuration component used in accordance with some embodiments. Adaptive power configuration component 300 includes a monitoring component 302 and an inference component 304. Monitoring component 302 is configured to collect usage data and data obtained from one or more communicatively coupled internal and/or external components/sensors and/or data based on operating conditions on vehicle-mounted computer 104 (collectively referred to herein as the run-time characteristics of vehicle-mounted computer 104). Non-limiting examples of collected usage data includes a date stamp (i.e., the time and date) associated with when the ignition switch is toggled on vehicle 102, the duration of a power state of the vehicle (i.e., the duration of ON and OFF states), and the activities, processes, and peripherals being executed before and after a power indication is received by vehicle-mounted computer 104. A non-limiting example of a sensor operating on vehicle-mounted computer 104 may be a location tracking sensor such as a global positioning system (GPS) sensor, a dead-reckoning sensor, indoor sensor nodes, a wireless triangulation sensor, and an accelerometer-based positioning sensor operating on vehicle-mounted computer 104 or operating on a peripheral communicatively coupled with vehicle-mounted computer 104, wherein the tracking sensor provides data relating to the current location of vehicle 102. The collected usage and run-time characteristics data may be stored in internal memory 216 or in an external storage device communicatively coupled to adaptive power configuration component 300.

Inference component 304 extrapolates patterns out of the collected usage and run-time data to create a dynamic profile. Based on the profile, inference component 304 may anticipate future usage and responsively adapt the power configurations of vehicle-mounted computer 104 and/or the power configurations of one or more communicatively coupled internal and/or external components. For example, in scenarios where vehicle 102 is known to be in an OFF state for a short period of time (for example, when inference component 304 determines that vehicle 102 is turned off for a scheduled mini break based on the profile), it would be beneficial to decrease boot up/resume time for one or more components that inference component 304 determines will be used immediately after vehicle 102 is put in the ON state. In these scenarios, adaptive power configuration component 300 may determine that certain peripherals may be left on which would have otherwise been turned off or which would have otherwise had their associated drivers unloaded from the run-time memory in vehicle-mounted computer 104. Accordingly, during these periods, peripherals and process intensive applications may be kept on, be prevented to going to a deep sleep mode, or be automatically turned back on before the ignition detect signal is received by vehicle-mounted computer 104.

On the other hand, in scenarios where vehicle 102 is known to be in an OFF state for a longer time period, for example, at the end of the day, during a shift change, or during a full lunch break, to better preserve the power supplied by vehicle 102, adaptive power configuration component 300 may turn off certain peripherals which would have otherwise been left on or have the associated peripheral driver remain loaded. Using the example above, inference component 304 may extrapolate patterns out of the collected usage and run-time data to "learn" the difference between, for example, a 10 minute coffee break, a 30 minute lunch break, a shift change, and an end of day shut down. The learned difference may then be stored in the profile. When the profile distinguishes between different types of scheduled breaks, adaptive power configuration component 300 may implement an appropriate power configuration to allow the best tradeoff between power usage and startup time and off mode behavior. Accordingly, depending on the profile created, the power configurations of vehicle-mounted computer 104 and/or the power configurations of one or more communicatively coupled internal and/or external components can be uniquely suited to the user environment.

Consider an example where adaptive power configuration component 300 may determine the pattern of usage with respect to the calendar. For example, a forklift at a warehouse may be used every weekday until 10 pm on Friday, except on predefined holidays. In this case, using previously collected usage data, adaptive power configuration component 300 may determine that vehicle 102 is to be kept off from 10 pm on Fridays to 7 am on Mondays.

As noted above, adaptive power configuration component 300 may also use the user's actions before, during and/or after the ignition detect signal is received in creating the profile and determining the power configurations of vehicle-mounted computer 104 and/or the power configurations of one or more communicatively coupled internal and/or external components. Consider an example where vehicle-mounted computer 104 is receiving barcode information through a scanner for a period of time before the vehicle is turned off. After the ignition is off, if there is no user activity on the vehicle-mounted computer 104, vehicle-mounted computer 104 and/or the connected components, except for the scanner, may be turned off. Vehicle-mounted computer 104 may use the profile to determine when the vehicle will be restarted and during the shut-down period, the scanner may continue scanning barcodes. Alternatively, the scanner may be turned off subsequent to receiving the ignition signal and turned back on before a break ends and the vehicle is to be restarted so that the operator can resume scanning immediately after turning on the vehicle. In another example, an operator of vehicle 102 may be receiving and confirming orders through the use of a paired Bluetooth headset. If the ignition is turned off during headset use, vehicle-mounted computer 104 may ensure that, for example, a Bluetooth radio, a wireless wide area network (WWAN) radio, or wireless local area network (WLAN) radio is kept on until the session ends. Once the session ends, vehicle-mounted computer 104 can decide to keep the radio on if subsequent headset use is anticipated or turn the radio off until immediately before the ignition is to be turned back on.

In some instances, adaptive power configuration component 300 may use the operating conditions of vehicle 102 to determine the power configurations of vehicle-mounted computer 104 and/or the power configurations of one or more communicatively coupled internal and/or external components. Consider an example where a facility includes a maintenance location where vehicle 102 may be taken for service. Subsequent to entering the maintenance location, a GPS sensor may send the location information to vehicle-mounted computer 104. Based on stored run-time characteristics and the operating location of vehicle 102, adaptive power configuration component 300 may determine which components to turn off, place in a sleep mode, or keep on, and the length of time each component is to remain in a particular power state. For example, using the GPS information and the profile, vehicle-mounted computer 104 may determine that vehicle 102 will be serviced for two hours. During this period, vehicle-mounted computer 104 may adaptively shut down one or more communicatively coupled internal and/or external components that are determined to not be needed when vehicle 102 is switched off for service and/or immediately after vehicle 102 is switched on. In addition, during this period if the battery is removed from the vehicle, vehicle-mounted computer 104 may switch to a backup battery and adapt the power configurations of the connected components as appropriate. In another example, if the vehicle is turned off in, for example, a freezer area of a warehouse, vehicle-mounted computer 104 with help from ambient temperature sensors, may require its internal heaters to be kept on to prevent frost and condensation build up. Typical heaters in vehicle-mounted computer 104 may include a display heater, a keyboard heater, and internal printed circuit board heaters. In this case, power may be diverted from other peripherals to only the heaters, the processor on vehicle-mounted computer 104 may be placed in a lower power state, and a wireless radio necessary for network connections may be kept on. The benefit being that once the vehicle ignition is turned on, the display will also turn on with the screen free of frost or any condensation once the vehicle is driven out of the freezer area.

In another example, adaptive power configuration component 300 may use the log-in credential (login identification (ID) and password or biometric information) in creating the profile and determining the power configurations of vehicle-mounted computer 104 and/or the power configurations of one or more communicatively coupled internal and/or external components. Consider that different users may use the same vehicle and different user roles may require different functions. For example, user 1 may use a scanner more often than user 2, and user 1 may begin scan operations immediately after vehicle 102 is switched on. In this example, adaptive power configuration component 300 may use user 1 log-in credentials to determine that a scanner should be kept on for short breaks. If user 2 uses the radio immediately after vehicle 102 is switched on, adaptive power configuration component 300 may use user 2 log-in credentials to determine that the radio should be kept on for short breaks. The user profiles may include the patterns derived from the other factors, for example, date/time stamps or location tracking in order to customize power configurations for users using the same vehicle to perform different tasks and/or to perform tasks at different times or locations. In some embodiments, the power configuration set by vehicle-mounted computer 104 may be overridden by an operator of vehicle or the operator may modify the profile.

Consider an example where user A works in the loading dock, uses the vehicle very frequently to keep up with inventory, and the vehicle is turned off only for breaks. Consider also that when the vehicle is switched on, user A is often looking at the display, transmitting and receiving data via a wireless radio, and periodically using peripherals such as a scanner or printer. For this usage pattern, vehicle-mounted computer 104 may be placed in a low power state during breaks, but may be automatically turn on and ready for use before the operator returns from break. If user B occasionally uses the same vehicle to move pallets short distances, when the vehicle is switched off while user B is logged in, vehicle-mounted computer 104 may be placed in a low power state but other essential components such as the wireless radios may be kept active. If user C occasionally uses the same vehicle and is required to frequently disembark from the vehicle and possibly turn off the ignition for short periods of time, while still needing full functionality of vehicle-mounted component 104, vehicle-mounted component 104 and/or peripherals may not be turned off when user C is logged in and the vehicle is switched off, unless there is system inactivity for longer than a predefined time-out period.

Inference component 304 may also include a prediction component 306 and a decision making component 308. Prediction component 306 is configured to forecast, for example, when the next ignition detect toggle event will occur. Prediction component 306 may make predictions by applying mathematical models to data (for example, date and/or time information) recorded from past ignition detect toggle events. In an embodiment, one or more mathematical models may be simultaneously applied to the recorded data in order to calculate an upcoming ignition detect toggle event. The results from one of the models is chosen and used by decision making component 308. For example, prediction component 306 may apply a weighted moving average model and another mathematical model, wherein the weighted moving average model assigns different weights to different positions in a sample window. If, for example, the weighted moving average model assigns a higher weight to newer data and if it is recorded that in a 90 day period the ignition detect signal is toggled on at 7:00 am 35 times, at 7:05 am 35 times, at 6:55 am 10 times, at 7:10 am 5 times, and at 6:50 am 5 times, with a +/−4 minute accuracy, and if it determined that 30 of the 35 times that the vehicle is toggled ON at 7:00 am occurred in the latter half of the 90 day period while all the times the vehicle is toggled at 7:05 am occurred in the first half of the 90 day period, by applying a higher weight to recent events, prediction component 306 is more likely to predict that the next ignition detect signal will toggle at 7:00 am instead of 7:05 am.

If using a second mathematical model prediction component 306 determines that the next ignition detect signal will toggle at 7:05 am and if the ignition detect signal actually toggles on at 7:05 am, after applying both models for a predefined period, if the second method is found to be more accurate than the weighted moving average model, then decision making component 308 may assign a higher priority to the second, more accurate method. In addition to using the information provided by prediction component 306, decision making component 308 may also use other information, such as user profiles, activities, and the vehicle location in updating the power profile. In an embodiment, preset priority preferences provided by a user may also be used to assign a priority to the information received, for example, from prediction component 306 or from other sources. In deciding the power configuration for a component, decision making component 308 may select the highest priority information to consider first and, if there is no information for a given situation, decision making component 308 may use a default setting as created, for example, by inference component 304 and then consider information from the next highest priority information.

Figure 4:
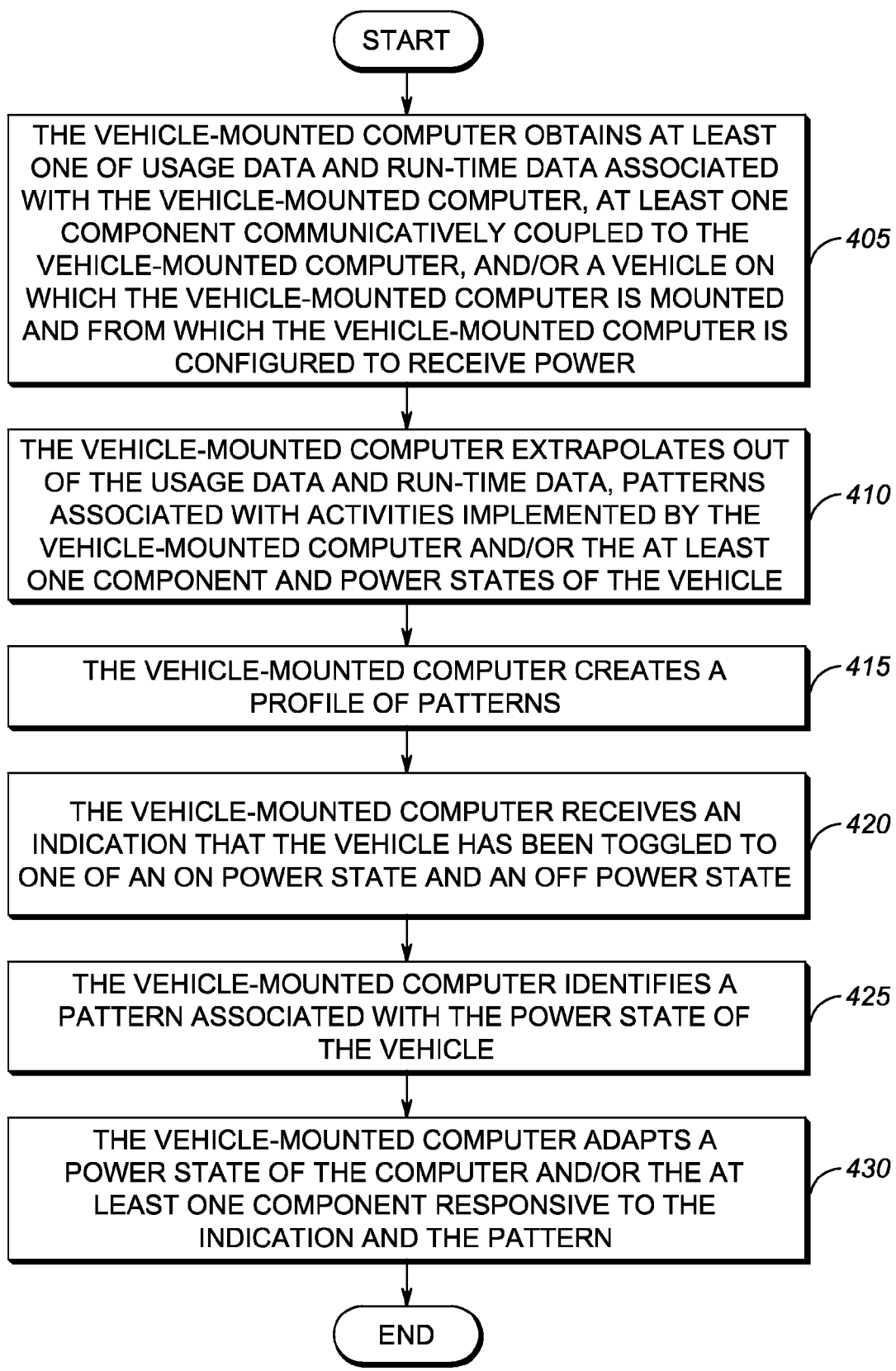
FIG. 4 is a flow diagram of the steps used in accordance with some embodiments.

FIG. 4 is a flow diagram of steps used in accordance with some embodiments. In 405, the vehicle-mounted computer obtains at least one of usage data and run-time data associated with at least one of the vehicle-mounted computer, at least one component communicatively coupled to the vehicle-mounted computer, and a vehicle on which the vehicle-mounted computer is mounted, wherein the vehicle-mounted computer is configured to receive power from the vehicle. At 410, the vehicle-mounted computer extrapolates out of the usage data and run-time data, patterns associated with activities implemented by the vehicle-mounted computer and/or the at least one component and power states of the vehicle. At 415, the vehicle-mounted computer creates a profile of patterns. At 420, the vehicle-mounted computer receives an indication that the vehicle has been toggled to one of an ON power state and an OFF power state. At 425, the vehicle-mounted computer identifies a pattern associated with the power state of the vehicle. At 430, the vehicle-mounted computer adapts a power state the computer and/or the at least one component responsive to the indication and the pattern.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A computer comprising:
   a communication unit configured to obtain at least one of usage data and run-time data associated with at least one of the computer, at least one component communicatively coupled to the computer, and a vehicle on which the computer is mounted;
   a memory configured to store the usage data and run-time data;
   a processor configured to:
      extrapolate, out of the usage data and run-time data, patterns associated with activities implemented by at least one of the computer and the at least one component and power states of the vehicle and create and store, on the memory, a profile of patterns;
      receive an indication that the vehicle has been toggled to one of an ON power state and an OFF power state, wherein the computer is configured to receive power from the vehicle;
      identify a pattern associated with the power state of the vehicle; and
      adapt a power state of at least one of the computer and the at least one component, responsive to the indication and the pattern, by predicting when an upcoming ignition detect toggle event will occur by applying one or more mathematical models to collected data and selecting results from a mathematical model determined to have a higher degree of accuracy, the one or more mathematical models including one or more of: a weighted moving average model, a mathematical model configured to be applied for a predefined period, and a mathematical model that assigns different weights to different positions in a sample window.

2. The computer of claim 1, wherein the usage data includes at least one of activities, processes and components being executed on the computer at least one of before, during, and after receipt of the indication, a date stamp associated with the indication, and a length of time the vehicle is in a power state.

3. The computer of claim 1, wherein the run-time data includes at least one of data obtained from one or more sensors and operation conditions of at least one of the vehicle, the computer, and the at least one component.

4. The computer of claim 1, wherein, based on the pattern, the processor is configured to anticipate future usage and responsively adapt the power state of at least one of the computer and the at least one component based on an anticipated future usage.

5. The computer of claim 1, wherein in adapting the power state of at least one of the computer and the at least one component, the processor is configured to determine a length of time the vehicle will remain in the OFF power state and maintain at least one of the computer and the at least one component in an ON state based on the determined length of time.

6. The computer of claim 1, wherein in adapting the power state of at least one of the computer and the at least one component, the processor is configured to determine a length of time the vehicle will remain in the OFF power state and switch at least one of the computer and the at least one component to an OFF state based on the determined length of time.

7. The computer of claim 1, wherein in adapting the power state at least one of the computer and the at least one component, the processor is configured to determine an operating condition of the vehicle and adapt the power state of at least one of the computer and the at least one component responsive to the operating condition.

8. The computer of claim 1, wherein in adapting the power state of at least one of the computer and the at least one component, the processor is configured to determine a user role and adapt the power state of at least one of the computer and the at least one component responsive to the user role.

9. The computer of claim 1, wherein in adapting the power state of at least one of the computer and the at least one component, the processor is configured to use preset user priority preferences provided by a user in creating a power profile, wherein the processor is configured to assign a priority to the preset user priority preferences.

10. A method comprising:
   obtaining, by a computer, at least one of usage data and run-time data associated with at least one of the computer, at least one component communicatively coupled to the computer, and a vehicle on which the computer is mounted, wherein the computer is configured to receive power from the vehicle;

extrapolating, out of the usage data and run-time data, patterns associated with activities implemented by at least one of the computer and the at least one component and power states of the vehicle; creating, by the computer, a profile of patterns; receiving, by the computer, an indication that the vehicle has been toggled to one of an ON power state and an OFF power state;

identifying, by the computer, a pattern associated with the power state of the vehicle; and adapting, by the computer, a power state of at least one of the computer and the at least one component, responsive to the indication and the pattern, by predicting, by the computer, when an upcoming ignition detect toggle event will occur by applying one or more mathematical models to collected data and selecting results from a mathematical model determined to have a higher degree of accuracy, the one or more mathematical models including one or more of: a weighted moving average model, a mathematical model configured to be applied for a predefined period, and a mathematical model that assigns different weights to different positions in a sample window.

11. The method of claim 10, wherein the usage data includes at least one of activities, processes and components being executed on at least one of the computer and the at least one component at least one of before, during, and after receipt of the indication, a date stamp associated with the indication, and a length of time the vehicle is in a power state.

12. The method of claim 10, wherein the run-time data includes at least one of data obtained from one or more sensors and operation conditions of at least one of the computer and the at least one component.

13. The method of claim 10, anticipating, by the computer, future usage and responsively adapting the power state of at least one of the computer and the at least one component based on an anticipated future usage.

14. The method of claim 10, wherein the adapting the power state comprises determining, by the computer, a length of time the vehicle will remain in the OFF power state and maintaining at least one of the computer and the at least one component in an ON state based on the determined length of time.

15. The method of claim 10, wherein the adapting the power state comprises determining, by the computer, a length of time the vehicle will remain in the OFF power state and switching at least one of the computer and the at least one component to an OFF state based on the determined length of time.

16. The method of claim 10, wherein the adapting the power state comprises determining, by the computer, an operating condition of the vehicle and adapting the power state of at least one of the computer and the at least one component responsive to the operating condition.

17. The method of claim 10, wherein the adapting the power state comprises determining, by the computer, a user role and adapting the power state of at least one of the computer and the at least one component responsive to the user role.

18. The method of claim 10, wherein the adapting the power state comprises using, by the computer, preset user priority preferences provided by a user in creating a power profile, wherein the preset user priority preferences assigns a priority to the information received.

* * * * *